(12) United States Patent
Otten et al.

(10) Patent No.: US 6,367,845 B1
(45) Date of Patent: Apr. 9, 2002

(54) CONTROL LINE COUPLING AND TUBULAR STRING-CONTROL LINE ASSEMBLY EMPLOYING SAME

(75) Inventors: Gregory K. Otten; Philip M. Snider, both of Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 09/436,611

(22) Filed: Nov. 9, 1999

(51) Int. Cl.$^7$ ................................................. F16L 55/00
(52) U.S. Cl. ....................................... 285/119; 285/333
(58) Field of Search .................................... 285/333, 390, 285/124.1, 124.5, 124.2, 119; 166/242.3, 242.6, 334

(56) References Cited

U.S. PATENT DOCUMENTS

| | | | | |
|---|---|---|---|---|
| 3,295,496 A | * | 1/1967 | Barton | 285/114 X |
| 4,084,067 A | * | 4/1978 | Gillemot | 174/92 |
| 4,202,087 A | * | 5/1980 | Wilderman | 24/263 R |
| 4,337,969 A | * | 7/1982 | Escaron et al. | 285/393 X |
| 4,601,334 A | * | 7/1986 | Lovegrove | 166/241 |
| 4,616,704 A | * | 10/1986 | Johnston | 166/242 |
| 5,217,071 A | * | 6/1993 | Ferry et al. | 166/242 |
| 5,325,714 A | * | 7/1994 | Lende et al. | 73/153 |
| 5,394,823 A | * | 3/1995 | Lenze | 166/105 |
| 5,749,605 A | * | 5/1998 | Hampton, III et al. | 285/333 X |
| 6,173,788 B1 | * | 1/2001 | Lembecke et al. | 166/387 |

* cited by examiner

Primary Examiner—Teri Pham Luu
(74) Attorney, Agent, or Firm—Browning Bushman P.C.

(57) ABSTRACT

A coupling for connecting first and second tubular members, the coupling including a tubular body having a first end portion and a second end portion, a first threaded box formed in the first end portion, a second threaded box formed in the second end portion, the tubular body having an outer, annularly extending surface with at least one groove formed in the outer surface and extending from the first end portion to the second end portion of the tubular body.

12 Claims, 3 Drawing Sheets

CONTROL LINE COUPLING AND TUBULAR STRING-CONTROL LINE ASSEMBLY EMPLOYING SAME

BACKGROUND OF THE INVENTION

1. Field of the Invention

The present invention relates to threaded couplings for use in connecting together elongate tubular members, such as tubing and casing joints, and, more specifically, to such a coupling on which can be mounted a control line such as a conduit for conveying fluids, electrical wires, cables, or the like.

2. Description of the Prior Art

In many downhole operations in oil and gas wells, there is a need to operate, control, or monitor equipment located in a borehole in which is disposed a string of tubular members, such as a string of tubing or casing. As is well known to those skilled in the art, to form a string of casing or tubing, successive sections or joints of tubing or casing are connected to one another by means of a coupling, the respective ends of the tubing or casing joints forming an externally threaded, pin connection, the coupling forming an internally threaded box connection at each end thereof. When it is necessary to operate, control, or monitor a piece of equipment to be located in the borehole, it is common practice to run the tubing or casing string together with one or more control lines disposed externally of the tubing or casing string. Currently, there is no accepted method of securing the control line to the tubing or casing string along its length, albeit that it may be connected at some point to the tubing or casing string as an adjunct to connecting it to the piece of downhole equipment to which it is attached.

It would therefore be of great benefit to have an assembly that would permit the control line(s) to be attached to the tubing or casing string (hereinafter "tubular string") at each coupling, thereby minimizing the possibility that the control line will become tangled or stuck in the borehole.

SUMMARY OF THE INVENTION

It is therefore an object of the present invention to provide a coupling for connecting tubular members, such as tubing or casing joints, to form a tubular string, the coupling being constructed to externally receive and hold a control line running along the tubular string.

Another object of the present invention is to provide a control line-tubular string assembly wherein the control line can be fastened to the tubular string along its length.

The above and other objects of the present invention will become apparent from the drawings, the description given herein, and the appended claims.

In one embodiment of the present invention, there is provided a novel coupling for connecting first and second tubular members. The coupling comprises a tubular body, the tubular body having a first end portion and a second end portion, a first, internally threaded box being formed in the first end portion and a second, internally threaded box being formed in the second end portion. The tubular body defines an outer, annularly extending surface, and at least one groove is formed in the outer surface and extends from the first end portion to the second end portion of the tubular body.

In another embodiment of the present invention, there is provided a tubular string and control line assembly comprising a coupling as described above, a first tubular member having a threaded pin end threadedly received in one end of the coupling and a second tubular member having a threaded pin end threadedly received in the other end of the coupling. A control lines is nested in the groove and extends along the tubular string. A tie holds the control line in the groove in the coupling.

DESCRIPTION OF THE PREFERRED EMBODIMENT

While the invention will be described with particular reference to a coupling forming part of a tubing string, it will be understood that the invention is not so limited and can be used with casing strings and other strings of tubular members that are formed by tubular members connected in end-to-end relationship by means of a threaded coupling.

Figure 1:
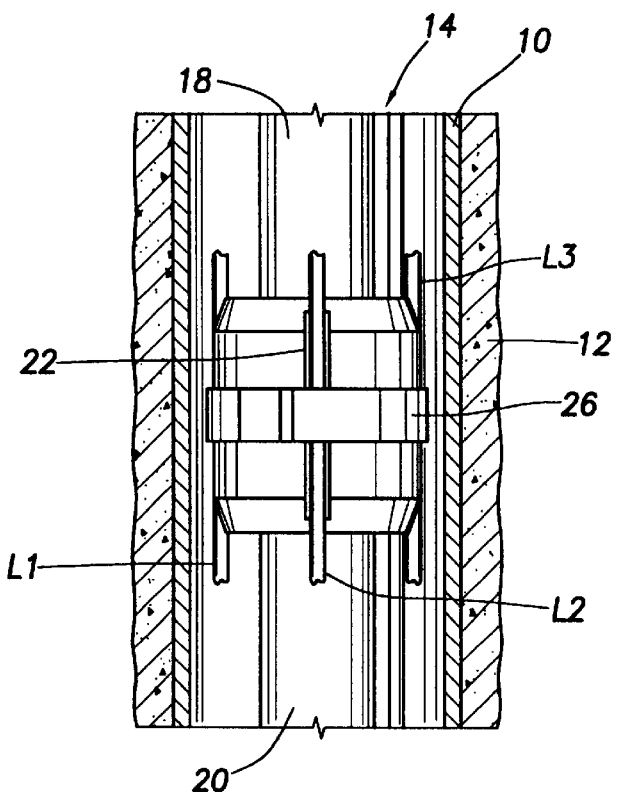
FIG. 1 is an elevational view, partly in section, showing the coupling of the present invention in a control line/tubular string assembly in a downhole environment.

With reference to FIG. 1, there is shown a portion of a cased borehole, the cased borehole including casing 10 cemented into the borehole with cement 12. Disposed in the casing 10 is a combined control line/tubing string, shown generally as 14, comprising a coupling 16, a first tubing joint 18 and a second tubing joint 20, tubing joints 18 and 20, in the conventional manner, being provided with external threads forming pin ends that are threadedly received in internally threaded box members formed at each end of coupling 16. Extending along control line/tubing string assembly 14 are a plurality of control lines L1, L2, and L3, there being another control line (not shown). Control lines L1, L2, and L3 are received or nested in longitudinally extending grooves 22 that extend axially of coupling 16 along the tubing string and are tied to coupling 16 by means of a metallic band 26 that encircles coupling 16.

Control lines L1, L2, etc., can each, independently, be a conduit or tube for conveying fluids, such as hydraulic fluids, or a conduit through which electrical wires, cables, or the like can be run. The construction and use of such control lines is well known to those skilled in the art and need not be described in further detail here.

Figure 3:
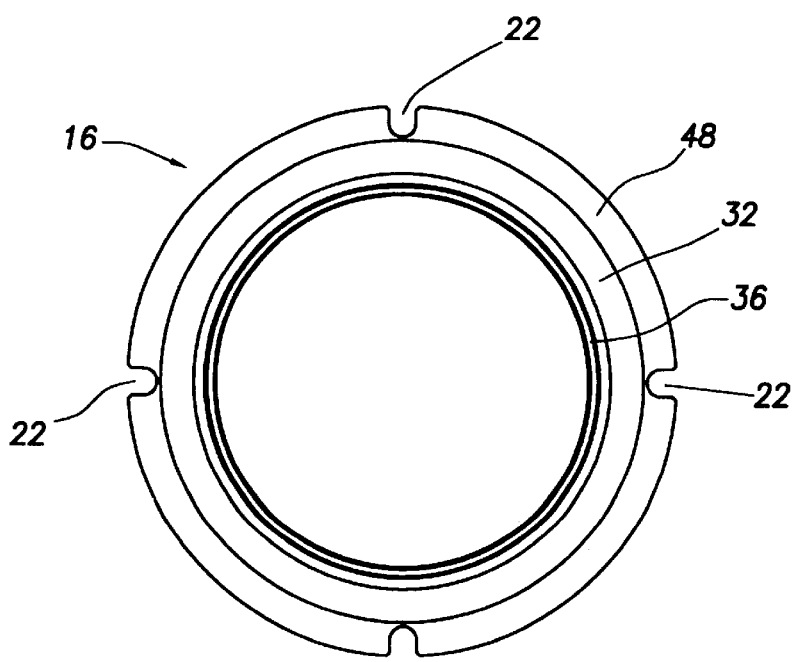
FIG. 3 is an elevational end view of the coupling shown in FIG. 2.
Figure 2:
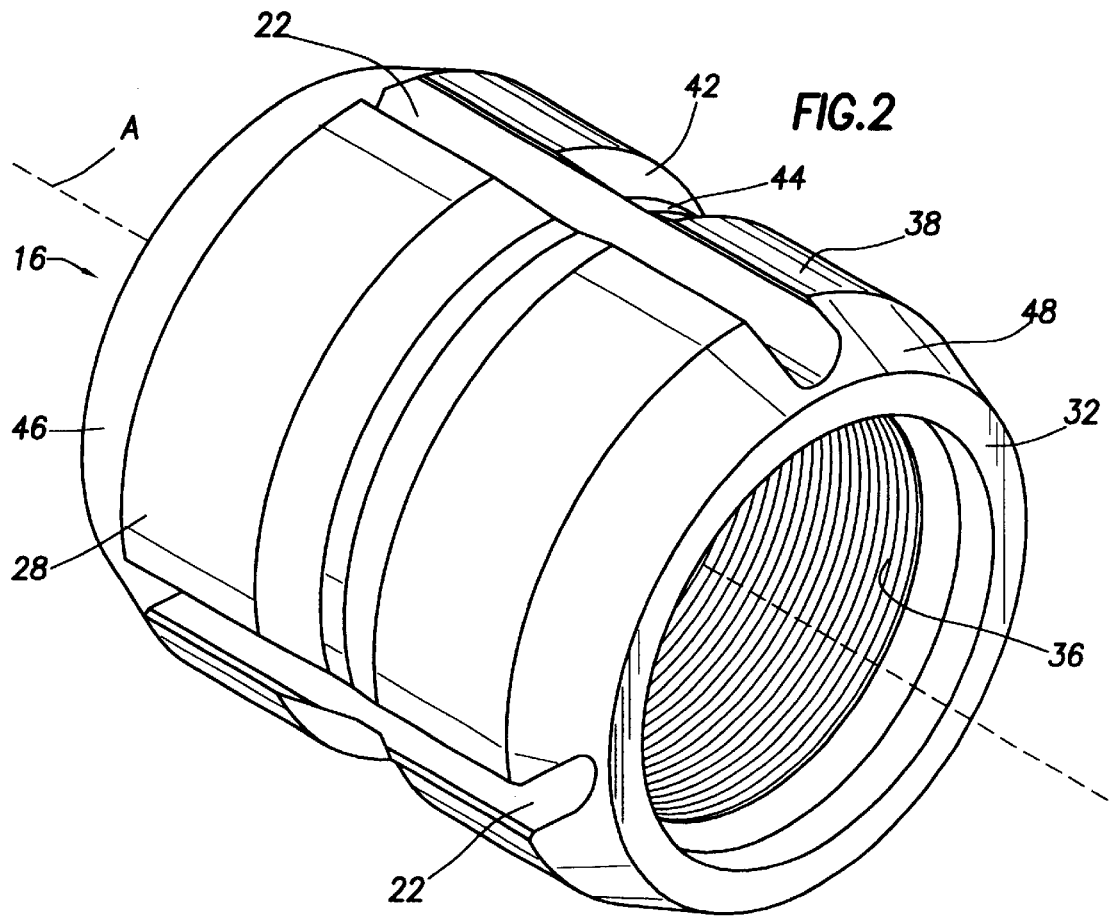
FIG. 2 is a perspective view of the coupling of the present invention.
Figure 4:
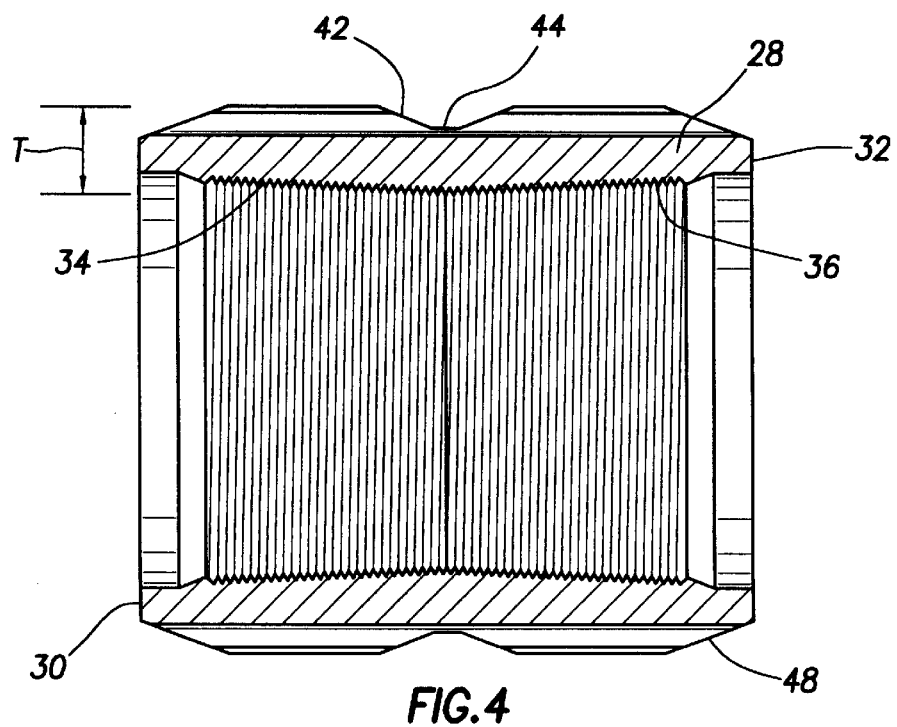
FIG. 4 is an elevational view, partly in section, of the coupling of FIG. 2.

Reference is now made to FIGS. 2–4 for a detailed description of the coupling 16. Coupling 16 comprises a tubular body, shown generally as 28, generally cylindrical in configuration, coupling 16 having a first end portion terminating in end surface 30 and a second end portion terminating in an end surface 32. A first, internally threaded box 34 is formed inside the first end portion, and a second, internally threaded box 36 is formed inside the second end portion. It will be appreciated that boxes 34 and 36 can comprise numerous different thread forms and that an internal shoulder can be formed in coupling 16 against which the ends of the tubular members make up.

With references to FIGS. 2 and 3, it can be seen that tubular body 28 has an outer, annularly extending surface 38 that, as best seen with FIG. 2, is an interrupted cylindrical surface. Formed in surface 38 are a series of grooves 22, grooves 22, as shown, being substantially straight, extending from the first end portion to the second end portion of tubular body 28, being substantially parallel to a central axis A passing longitudinally through tubular body 28 and as best shown in FIG. 3, being spaced at generally 90° intervals around surface 38. While four grooves 22 are shown, it will be appreciated that as few as one groove 22 may suffice and that more than four grooves can be used, if desired. It will further be appreciated that while grooves 22 are shown as being straight, parallel to one another and to the central axis passing through tubular body 28 and displaced circumferentially from one another by 90°, in certain cases, grooves 22 could be helical or virtually any other configuration—e.g., rather than being parallel to one another and to a central axis A passing through tubular body 28, the grooves 22 could be parallel to one another but asymmetric to the central axis passing through tubular body 28. Further, the grooves 22 need not be spaced at any particular interval around surface 38.

Also formed in surface 38 is an annular recess 42, annular recess 42, as shown, being concentric with the central axis A passing through tubular body 28 such that recess 42 is substantially perpendicular to grooves 22 at their respective intersections. In any event, recess 42 will be formed transverse to grooves 22, regardless of their configuration, e.g., spiral, parallel to one another and to the central axis A, or parallel to one another and skewed with respect to the central axis A. Annular recess 42 will generally have a radiused bottom 44 and a depth sufficient such that when a control line, e.g., L1, is nested in a groove 22, annular metallic band 26 will be received in recess 44 and be substantially flush with or below surface 38. In a preferred embodiment, radiused bottom 44 will have a radius that is one-half the diameter of the control line, which, as well known to those skilled in the art, is generally small-diameter tubing.

As noted above, metallic band 26 serves as a tie to secure control lines L1, L2, L3 in a nested position in grooves 40. It will be understood by those skilled in the art that band 26 can be secured to tubular body 28 by methods well known with respect to the use of flexible steel straps that are commonly used in a variety of applications for securing purposes, e.g., bundles of elongate members, packing and crating, etc. In such applications, as well as in the present invention, the flexible straps are tensioned around tubular body 28, fastened together, and then cut to leave a substantially continuous annular band of the steel strap. It will be understood that the use of annular metallic band 26 is merely exemplary of techniques that can be used as a tie to hold control lines L1, L2, L3 in grooves 22. Thus, the word "tie" is intended to have its broadest meaning in that it is any structural element or formation that serves to link other elements together—i.e., in this case, to link control lines L1, L2, L3 to tubular body 28. Thus, detents or spring clips could be disposed in grooves 22 such that the control line(s) could be snapped into the grooves 22.

It will be appreciated that the coupling 16 of the present invention will have a wall thickness, generally indicated as T in FIG. 4, that is thicker than the standard API couplings commonly used in tubing and casing strings. In general, the tubular body 28 will have a wall thickness that is greater than the wall thickness of the standard API coupling by the depth of the grooves 38 measured from the radiused bottom 44 to surface 38. In a preferred embodiment, and as compared to a standard API coupling, the outside diameter of the coupling 16 of the present invention is increased to a value that is larger than twice the diameter of control lines L1, L2, which are received in the grooves 22. It will be appreciated that this increased wall thickness of coupling 16 is necessary to ensure that the coupling 16 does not fail since both grooves 22 and recess 42 will tend to form stress risers in tubular body 28. This increased wall thickness of coupling 16 will also generally necessitate that the first and second end portions of tubular body 28 be chamfered to form frustoconical surface 46 adjacent end surface 30 and frustoconical surface 48 adjacent end surface 32. Generally, surfaces 46 and 48 form a 20° angle with respect to the central axis A passing through tubular body 28, although steeper or shallower angles can be used. The surfaces 46, 48 minimize the tendency of the tubular string made up of the tubular members and coupling 16 from hanging up while the tubular string is being run into or out of the borehole.

Figure 5:
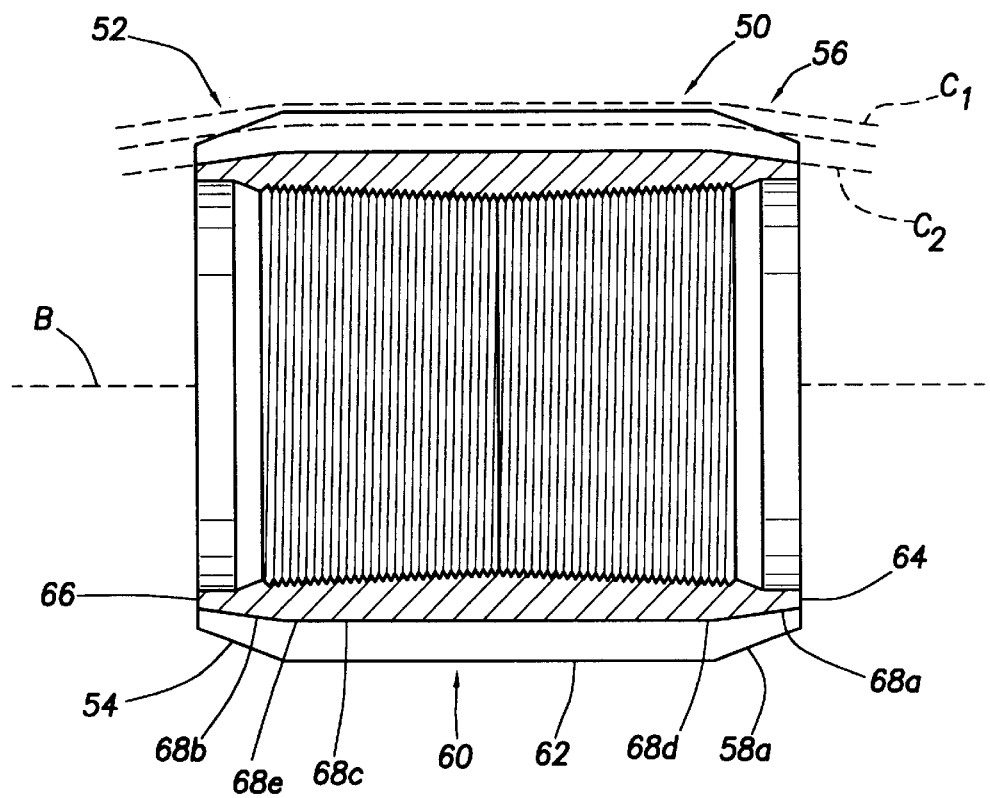
FIG. 5 is an view similar to FIG. 4 showing another embodiment of the coupling of the present invention.
Figure 6:
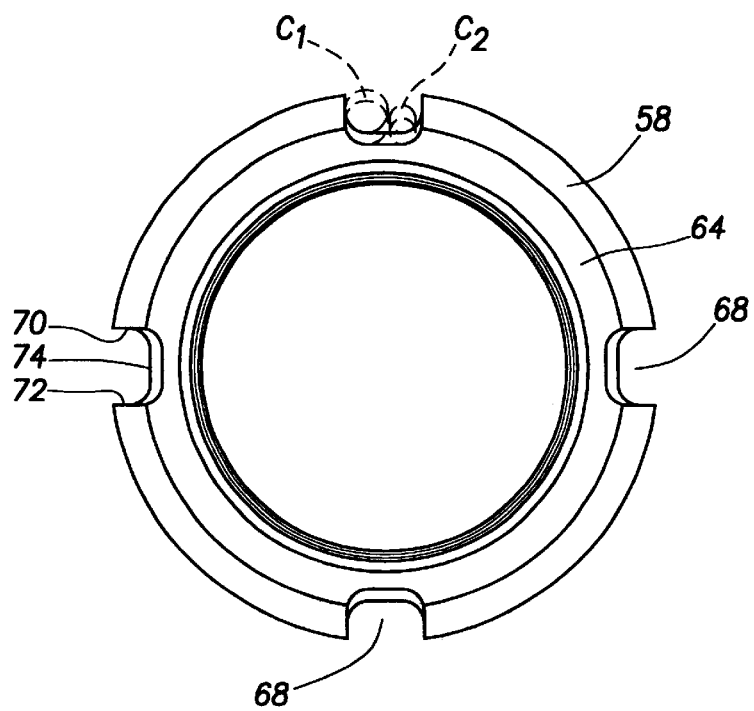
FIG. 6 is a view, similar to FIG. 3, of the coupling shown in FIG. 5.

With reference now to FIGS. 5 and 6, there is shown a slightly modified embodiment of the coupling of the present invention. Basically, the embodiment shown in FIGS. 5 and 6 differs from that previously described in that the grooves are wider so as to accommodate several control lines. Additionally, the grooves are "contoured" from one end portion to the other end portion such that the control lines, cables, or the like follow a generally smooth path (essentially a shallow arc) as they extend from one first tubular member, over the coupling, and to the second tubular member; i.e., the control lines are not subject to any sharp bends that could induce stresses. With reference, then, to FIGS. 5 and 6, the coupling shown generally as 50 has a first section 52 forming the first end portion and defining a first frustoconical outer surface 54, a second section 56 defining the second end portion and forming a second frustoconical outer surface 58 and an intermediate section 60 disposed between sections 52 and 56 and defining an outer cylindrical surface 62. As best seen in FIG. 6, the first end portion terminates in an annular, axially facing first end surface 64, and the second end portion terminates in an annular, axially facing second end surface 66. The coupling 50 defines a central, longitudinally extending axis designated as B. Coupling 50 is provided with a series of grooves 68 that, as shown, are generally parallel to central axis B and are spaced at 90° intervals around the outer surface of coupling 50. Unlike grooves 22 shown in FIGS. 2, 3, and 4, grooves 68 are generally U-shaped, having a first leg portion 70, a second leg portion 72, and a substantially straight bottom portion 74, the intersection of first leg portion 70 and bottom portion 74 being radiused, the intersection of second leg portion 72 and bottom portion 74 likewise being radiused. As can be seen in FIG. 6, the increased width of groove 68 with the radiused corners in groove 68 serves to accommodate dual control lines $C_1$ and $C_2$.

With reference particularly to FIG. 5, grooves 68 are generally contoured along the length of coupling 50—i.e., from first end surface 64 to second end surface 66—and comprise a first run 68a formed in the first section and at an angle to axis B, generally at about 5–10°, a second run 68b formed in the second section and at a like angle to the longitudinal axis B, and an intermediate run 68c formed in the cylindrical section 60 of coupling 50 and generally parallel to axis B. As can also be seen, first run 68a and intermediate run 68c have a radiused intersection 68d, while second run 68b and intermediate run 68c have a radiused intersection 68e. It will thus be seen that when control lines $C_1$ and $C_2$ are nested in grooves 68 in generally side-by-side relationship, they will effectively follow a smooth, shallow arc that prevents control lines 61 and 62 from being kinked, or at least put under excessive stress. Because there are no sharp edges or corners in the grooves 68, there is no necessity to make sharp bends in the control lines $C_1$ and $C_2$.

As noted above with respect to the embodiment shown in FIGS. 1–4, grooves 68 need not be straight or parallel to longitudinal axis B and can be helical or asymmetric to longitudinal axis B. Again, while in the embodiment shown in FIGS. 5 and 6 there are four grooves 68, it will be appreciated that one groove may suffice in certain circumstances but that any number of grooves can be employed and that the grooves can be spaced at any desirable circumferential spacing.

It is apparent that the present invention provides an efficient and simple manner of attaching and protecting control lines on tubular strings, such as tubing and casing strings, commonly used in the oil and gas industry. However, it is to be understood that the use of the coupling and the tubular string and control line assembly formed using the coupling is not limited to downhole operations in oil and gas wells. Indeed, the invention is applicable to any system where there is a tubular string comprised of threaded tubular members coupled together by a coupling such as coupling 16 and wherein a control line or some other elongate member is required to be run along the length of the tubular string and it is desirable that the control line or elongate member be somehow held to the tubular string.

While the invention has been particularly shown and described with reference to a preferred embodiment thereof, it will be understood by those skilled in the art that various changes and modifications in form and details may be made without departing from the spirit and scope of the invention.

What is claimed is:

1. A coupling for connecting first and second tubular members, comprising:

a tubular body, said tubular body having a first end portion defining a first frustoconical outer surface and a second end portion defining a second frustoconical outer surface and an intermediate portion disposed between said first and second end portions and defining an outer cylindrical surface, said first end portion terminating in an annular, axially facing first end surface, said second end portion terminating in an annular, axially facing second end surface, the tubular body having at least one groove formed in said outer surface and extending from said first end surface to said second end surface of said tubular body, said groove having a first run formed in said first frustoconical surface of said tubular body and a second run formed in said second frustoconical surface of said tubular body, and an intermediate run formed in said cylindrical surface of said tubular body, said first run and said intermediate run having a radiused intersection and said second run and said intermediate run having a radiused intersection.

2. The coupling of claim 1 wherein said at least one groove is substantially straight.

3. The coupling of claim 2 wherein there are a plurality of said grooves.

4. The coupling of claim 3 wherein said tabular body defines a central axis extending longitudinally through said body and said grooves are substantially parallel to said central axis.

5. The coupling of claim 4 wherein there are four of said grooves spaced at 90° intervals around said outer surface of said tubular body.

6. The coupling of claim 1 wherein said tubular body includes an annular recess formed in said outer surface, said annular recess being disposed generally transverse to said groove.

7. The coupling of claim 6 wherein said at least one groove is substantially straight.

8. The coupling of claim 7 wherein there are a plurality of said grooves.

9. The coupling of claim 8 wherein said tubular body defines a central axis extending longitudinally through said body and said grooves are substantially parallel to said central axis.

10. The coupling of claim 9 wherein there are four of said grooves spaced at 90° intervals around said outer surface of said tubular body.

11. The coupling of claim 7 wherein said groove has a radiused bottom.

12. The coupling of claim 1 wherein said groove has a radiused bottom.

\* \* \* \* \*